United States Patent [19]
Kotliar

[11] Patent Number: 5,964,222
[45] Date of Patent: *Oct. 12, 1999

[54] HYPOXIC TENT SYSTEM

[76] Inventor: Igor K. Kotliar, 50 Lexington Ave., Suite 249, New York, N.Y. 10010

[ * ] Notice: This patent is subject to a terminal disclaimer.

[21] Appl. No.: 08/985,104
[22] Filed: Dec. 3, 1997

Related U.S. Application Data

[63] Continuation-in-part of application No. 08/505,621, Jul. 21, 1995, Pat. No. 5,799,652, application No. 08/739,379, Oct. 29, 1996, abandoned, and application No. 08/797,242, Feb. 8, 1997, Pat. No. 5,924,419.
[60] Provisional application No. 60/055,087, Jul. 31, 1997.
[51] Int. Cl.⁶ ..................................................... A61G 10/00
[52] U.S. Cl. .................................. 128/205.26; 128/205.11
[58] Field of Search .......................... 128/205.26, 205.11, 128/202.12, 200.24, 204.18, 204.21; 600/21

[56] References Cited

U.S. PATENT DOCUMENTS 5,799,652  9/1998  Kotliar ................................ 128/205.11

Primary Examiner—John G. Weiss
Assistant Examiner—Charles W. Anderson

[57] ABSTRACT

Hypoxic tent system represents a portable travel version of Hypoxic Room System and is designated mostly for passive hypoxic training of athletes during rest. The system consists of a light portable tent, which can be easily erected on a bed or mattress. The tent is supported by a supporting structure, which can be disassembled in segments or deflated. Oxygen-depleted air is transmitted inside the tent by hypoxic generator, which employs membrane separation or pressure-swing adsorption principles for extracting oxygen from ambient air. Oxygen-depleted air is also filtered by HEPA filter and may be chilled by an optional air cooler. Hypoxic tent system can be easily packed in a travel case and installed in any hotel room by attaching to a bed. Hypoxic tent system provides a low-oxygen environment with preferably 11 to 15% oxygen and can also be used by disabled for exercising their cardiopulmonary systems, increasing strength, endurance and boosting immunity.

19 Claims, 1 Drawing Sheet

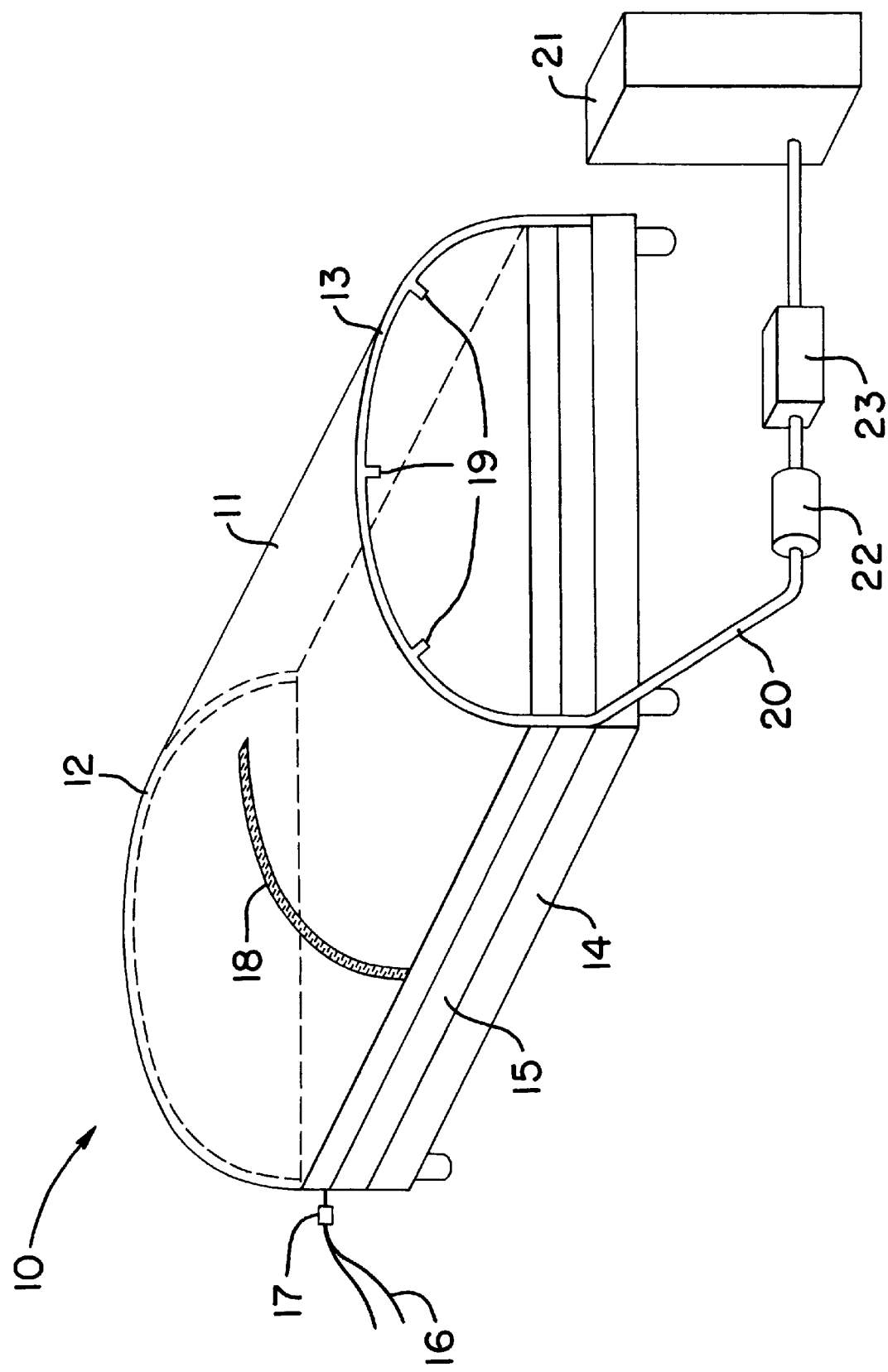

HYPOXIC TENT SYSTEM

This appln. claims the benefits of U.S. Provisional Appln. No. 60/055,087 filed Jul. 31, 1997, a continuation in part of patent applications Ser. No. 08/505,621 now U.S. Pat. No. 5,799,652. "Hypoxic Room System and equipment for hypoxic training and therapy," filed Jul. 21, 1995, which is a C-I-P of Ser. No. 08/739,379 now abandoned. "Hypoxic flow system for individual active and passive hypoxic training," filed Oct. 29, 1996, which is a C-I-P of Ser. No. 08/797,242. Allowed "Apparatus for passive hypoxic training and therapy," filed Feb. 8, 1997 now U.S. Pat. No. 5,924,419.

FIELD OF INVENTION

This invention relates to enclosed low-oxygen environments created for resting in for the purposes of improving the cardio-pulmonary system of professional athletes, and for improving the health of any user, including the sick, injured and disabled.

The Hypoxic Tent System provides a safe low-oxygen environment at normal atmospheric pressure at simulated altitudes up to 15,000 feet or higher for sleeping in.

The benefits of the inhalation of low oxygen gas mixtures are fully described in previous patent applications Ser. Nos. 08/505,621, 08/739,379 and 08/797,242, and have recently been the focus of worldwide media attention. An athlete sleeping at a simulated altitude will increase his pulmonary ventilation and red blood cell count, and will need less oxygen to achieve the same performance level. This means his performance will improve in a normal oxygen environment. Hypoxic training may also be used in preparation for competition at high altitudes.

The invention presented here provides a convenient, low cost solution to create such an environment for sleeping. This invention makes it possible to make a portable version of the Hypoxic Room System, convenient for athletes while traveling, and may be easily installed at home or in any hotel room.

The Hypoxic Tent System can also be used as a therapeutic device to increase strength and endurance and boost immunity. The disabled can use this system for training their cardio-pulmonary systems.

PRIOR ART

The U.S. Pat. No. 5,467,764 of Nov. 21, 1995, "Hypobaric Sleeping Chamber," shows hypobaric sleeping chamber, which is used by some athletes for sleeping in for the purposes of improving pulmonary performance. This invention has significant drawbacks. Firstly, this chamber must be completely sealed, which requires rigid construction and is unsafe. Also, it has a negative psychological effect, since the user is cut off from the outside world and is confined inside a narrow tube. Further, the low pressure and dryness created inside this chamber can cause rapid dehydration, enlargement of internal organs, headaches, and irritation of the sinus and respiratory system.

DESCRIPTION OF THE INVENTION

FIG. 1 shows a schematic view of the most preferred embodiment 10. A tent 11 is fitted onto a bed 14 and upheld by supporting arches 12 and 13, which are first fastened onto the sides of a mattress 15 preferably by means of a drawstring or an elastic band (not shown). Tent 11, having a drawstring 16 with a locking device 17 at its bottom edge, is additionally tightened over the sides of mattress 15.

Tent 11 is made of light, thin fabric such as parachute nylon or synthetic material such as clear vinyl or a combination of both. The most preferred material is one which will allow the fast diffusion of moisture from tent 11. Tent 11 has an entryway 18, which can be closed preferably by a zipper, ziploc mechanism, Velcro, magnetic tape or other closing device, openable and closeable from the inside or outside of tent 11.

Supporting arches 12 and 13 are preferably made from light metal or plastic tubes which can be disassembled in segments. Arch 13 is fitted to tubing 20 on one end, is closed on the other end and has discharge nozzles 19 inside tent 11. A hypoxicator 21, described in previous patent applications, supplies low oxygen air into tent 11 through tubing 20, arch 13 and discharge nozzles 19.

Tent 11 can also have an inflatable supporting structure instead of the supporting tubing of arches 12 and 13.

A filter 22 filters the low oxygen air of airborne particles and bacteria. The most preferred type of filter is a HEPA filter, which is widely available from a number of manufacturers. An optional air cooling device 23 may be installed in the system to cool the low oxygen air for comfort. The cooling effect may also be achieved by increasing the length of tubing 20 if the ambient air outside tent 11 is already cool. For hot and humid climates, a separate air conditioning unit (not shown) may be installed instead of cooling device 23. This separate air conditioning unit would draw in air from tent 11, cool and dehumidify it and recirculate it back into tent 11. However, in most cases, excessive water vapor and carbon dioxide, much faster than other gases, will quickly diffuse through the fabric of tent 11, and will escape along with exiting air.

Hypoxicator 21 draws ambient air in and separates it into oxygen enriched and oxygen depleted fractions, employing membrane separation or pressure-swing adsorption technologies. The oxygen enriched fraction is expelled from hypoxicator 21 and the oxygen depleted fraction, having an oxygen content preferably from 11 to 15 percent, is constantly pumped into tent 11. A standard hypoxicator made by Hypoxico Inc. supplies approximately 60 liters/minute of hypoxic air with a 15% oxygen content, which corresponds to an altitude of 8,500 feet, providing the most suitable and safe environment for hypoxic training during sleep. Air pressure remains near normal inside tent 11 as a result of air exiting from naturally existing gaps in the tent construction, which does not have to be airtight. For example, air can exit around the zipper or other closing mechanism of entryway 18, as a result of the looseness of drawstring 16 and through fabric pores. Additional air escape openings may be provided as well, if necessary.

Hypoxic tent system can be easily disassembled and packed in luggage.

What is claimed is:

1. A system for providing a reduced-oxygen atmosphere for breathing to a user at rest, said system comprising:
   an oxygen-extraction device having an inlet taking in ambient air and an outlet for transmitting oxygen-depleted air;
   a portable tent having internal space therein and an entry communicating with said internal space and through which the user can enter said internal space; said tent having collapsible supporting structure;
   said outlet communicating with said internal space and transmitting said oxygen-depleted air to said internal space;
   said internal space communicating with an external environment through naturally existing gaps and fabric pores, allowing excess air to escape said internal space and equalizing atmospheric pressure inside said tent to the outside parameter.

2. The system according to claim 1 and said entry closable by zipper, ziploc mechanism, hook and fastener or magnetic tape, and when closed, dividing said internal space from the external atmosphere.

3. The system according to claim 1 and said hypoxic tent made of soft synthetic or natural material and supported by supporting structure, which is inflatable or assembled from segments made from metal, plastic or composite material.

4. The system according to claim 1 and said hypoxic tent being attached to mattress or having mattress inside, allowing user to rest inside said internal space while inhaling oxygen-depleted air.

5. The system according to claim 1 and said outlet communicating with said internal space through air filter and optional air cooling device.

6. A portable travel system for providing a low-oxygen environment to a user for sleeping comprising:
- a breathing tent comprising soft walls supported by a supporting structure and an entry defining a closed space for, accessible to the user through said entry being selectively closable so that when closed, the tent is substantially isolated from the outside environment;
- a gas-processing device having outlet communicating with said closed space and transmitting oxygen-depleted gas mixture through said outlet inside said closed space.

7. The travel system according to claim 6 and said breathing tent designed to be attached to or erected on a resting platform, mattress or bed, allowing the user to rest or sleep inside said tent.

8. The travel system according to claim 6 and said portable travel system designed for quick and easy installation and disassembly at home or hotel room.

9. The travel system according to claim 6 and said portable system designated for use by athletes while sleeping or resting in order to improve their performance in normal oxygen environment.

10. The system according to claim 6 and said portable system designated for therapeutic use to increase strength and endurance and boost immunity.

11. The system according to claim 6 and said portable system designated for use by disabled to train their cardio-pulmonary systems.

12. The travel system according to claim 6 and said tent made of material allowing water vapor to diffuse through.

13. The travel system according to claim 6 and said supporting structure made of metal or plastic segments.

14. The travel system according to claim 6 and said supporting structure being inflatable to support said breathing tent.

15. The system according to claim 6 and said gas-processing device employing membrane air-separation technology to provide said oxygen-depleted gas mixture.

16. The system according to claim 6 and said gas-processing device employing pressure-swing adsorption technology to provide said oxygen-depleted gas mixture.

17. The system according to claim 6 and said oxygen-depleted gas mixture being cleaned by HEPA filter and chilled by air cooler before entering said closed space inside said tent.

18. The system according to claim 6 and said low-oxygen environment having oxygen content from 11% to 15% at sea level.

19. The system according to claim 6 and said portable travel system which can be disassembled and packed in luggage for travel.

\* \* \* \* \*